(12) United States Patent
Tait et al.

(10) Patent No.: US 10,694,160 B2
(45) Date of Patent: Jun. 23, 2020

(54) CHANNEL BASED PROJECTOR CALIBRATION

(71) Applicant: Disney Enterprises, Inc., Burbank, CA (US)

(72) Inventors: Thomas T. Tait, Santa Clarita, CA (US); Clarissa J. Matalone, Los Angeles, CA (US); Anselm Grundhofer, Uster (CH); Lucas T. Phelan, Sunland, CA (US); Mark A. Reichow, Santa Clara, CA (US); David R. Rose, Glendale, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/196,574

(22) Filed: Nov. 20, 2018

(65) Prior Publication Data
US 2020/0162710 A1 May 21, 2020

(51) Int. Cl.
| | | |
|---|---|---|
| *H04N 9/31* | (2006.01) | |
| *H04N 17/02* | (2006.01) | |
| *G06T 7/80* | (2017.01) | |
| *G06T 7/00* | (2017.01) | |
| *G06T 3/40* | (2006.01) | |

(52) U.S. Cl.
CPC ......... *H04N 9/3182* (2013.01); *G06T 3/4015* (2013.01); *G06T 7/80* (2017.01); *G06T 7/97* (2017.01); *H04N 9/3191* (2013.01)

(58) Field of Classification Search
CPC ...... H04N 17/002; H04N 17/00; H04N 17/02; H04N 17/04; H04N 9/3185; H04N 9/3182; H04N 9/31; H04N 9/3194; H04N 9/3191; G06T 7/80; G06T 7/97; G06T 3/4015
USPC ........ 348/180–182, 187–191, 744–747, 806, 348/807; 345/214
See application file for complete search history.

(56) References Cited

U.S. PATENT DOCUMENTS

| | | |
|---|---|---|
| 4,961,030 A | 10/1990 | Ogino et al. |
| 5,258,830 A | 11/1993 | Schmidt et al. |
| 5,345,262 A | 9/1994 | Yee et al. |
| 5,497,054 A | 3/1996 | Ryu |
| 5,532,765 A | 7/1996 | Inoue et al. |
| 5,663,774 A | 9/1997 | Baik |
| 5,742,698 A | 4/1998 | Minami et al. |
| 6,483,555 B1 | 11/2002 | Thielemans et al. |

(Continued)

FOREIGN PATENT DOCUMENTS

| | | |
|---|---|---|
| CN | 1658651 A | 8/2005 |
| DE | 3311971 A1 | 10/1984 |

(Continued)

*Primary Examiner* — Sherrie Hsia
(74) *Attorney, Agent, or Firm* — Dorsey & Whitney LLP

(57) ABSTRACT

The present disclosure is related to methods and systems for calibrating a projector. The method includes displaying a plurality of calibration patterns, where the calibration patterns are displayed separately by different wavelength channel bands, e.g., red channel, blue channel, green channel. The method then includes receiving by a processing element one or more calibration images. The method then includes determining one or more displacements corresponding to a plurality of pixels in the calibration image with respect to a plurality of pixels in the calibration pattern to adjust for distortions on a per wavelength channel basis.

20 Claims, 6 Drawing Sheets

(56) References Cited

U.S. PATENT DOCUMENTS

| | | |
|---|---|---|
| 6,771,233 B1 | 8/2004 | Kim |
| 6,984,042 B2 | 1/2006 | Halsberghe et al. |
| 7,034,901 B2 | 4/2006 | George |
| 7,196,741 B2 | 3/2007 | Hicks |
| 7,227,593 B2 | 6/2007 | Lee et al. |
| 7,246,907 B2 | 7/2007 | Imahase et al. |
| 7,268,837 B2 | 9/2007 | Melton |
| 7,420,591 B2 | 9/2008 | Cho |
| 7,733,429 B2 | 6/2010 | Maxson et al. |
| 8,764,196 B2 | 7/2014 | Redmann |
| 2003/0206179 A1* | 11/2003 | Deering ................ G06T 3/0081 345/589 |
| 2006/0176408 A1 | 8/2006 | Choi |

FOREIGN PATENT DOCUMENTS

| | | |
|---|---|---|
| DE | 3920965 A1 | 1/1991 |
| JP | H09182096 A | 7/1997 |
| KR | 20050116653 A | 12/2005 |

* cited by examiner

CHANNEL BASED PROJECTOR CALIBRATION

FIELD

The present disclosure relates generally to adjusting projected images from a projector, and more specifically to compensating projected images to neutralize effects chromatic aberration.

BACKGROUND

Projection systems are used in various fields such as entertainment, amusement park attractions, and augmented reality. Projection systems typically display image pixels as a combination of component primary wavelengths, or colors, of electromagnetic energy, including the spectrum of visible light. To increase image quality, contrast, and sharpness, typically it is desired that the component color pixels display at the same location on a projection surface. However, a phenomenon called chromatic aberration (also chromatic distortion or spherochromatism) affects the way different wavelengths of electromagnetic energy, including light, react to the optical path in different ways. Various wavelengths of energy bend and move different amounts as they travel through the optical path to the projection surface, landing in in undesired locations.

Traditional calibration methods used for projectors often may not meet the demands of projection systems with complex projection surface geometry, using non-standard lenses, or other non-traditional uses. Additionally, calibration methods typically are time and labor intensive, subject to the skill, experience, priorities, techniques, and qualitative judgment of the individual technician performing the work. The resulting calibration is often a compromise, where select portions of the displayed image are more clearly calibrated at the expense of others.

SUMMARY

According to one embodiment, a calibration method to calibrate a projector including a first light channel and a second light channel is disclosed. The method includes: displaying by the projector utilizing the first light channel a first calibration pattern onto a projection surface, where the first light channel emits light within a first wavelength band that does not overlap with light wavelengths projected by the second light channel; capturing by a camera a first calibration image of the first calibration pattern on the projection surface; generating by a processing element a first corrective pixel map by comparing the first calibration image to the first calibration pattern.

According to another embodiment, a method for correcting visual media content is disclosed. The method includes receiving by a processing element visual media content; separating the visual media content into a first media portion corresponding to a first primary color channel; modifying by the processing element the first media portion to generate a first output media portion by translating input pixels to corrective pixels utilizing a corrective pixel map corresponding to the first primary color channel; and displaying the first output portion by a projector.

According to yet another embodiment, a system for projector calibration is disclosed. The system includes a camera; a projector to project images onto a projection surface; and a computer in communication with the camera and the projector. The computer includes a processor configured to perform the following operations: display a first calibration pattern in a first light channel; receive by the camera a first calibration image of the first calibration pattern; generate by a processing element a first corrective pixel map by comparing the first calibration image to the first calibration pattern; and modify by the processing element an input media to generate a first output media by translating input pixels to corrective pixels utilizing the first corrective pixel map; and display the first output media by the projector.

SPECIFICATION

Figure 1:
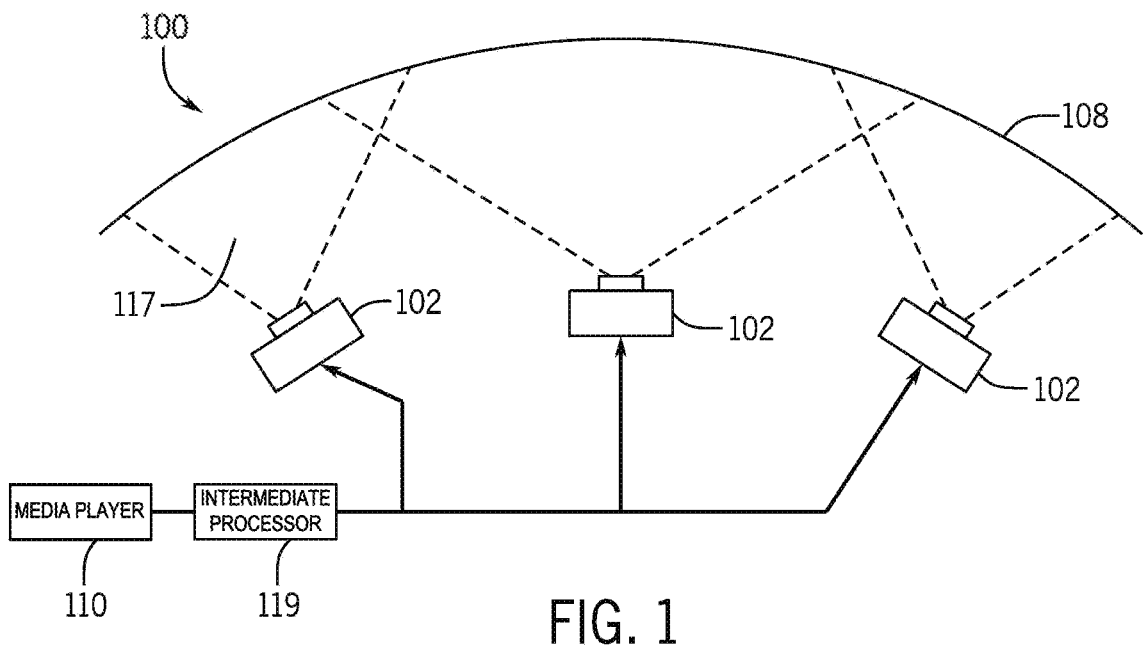
FIG. 1 is a plan view of a multi-projector system.

The present disclosure is related to a system for calibrating color convergence in a system of one or more projectors, helping to reduce or neutralize chromatic aberration of pixels in the displayed image. A calibrated projector can display an image with accurate representations of colors, increased sharpness of individual pixels, high contrast, and in the case of multi-projector systems, more accurate blending of images between projectors. With the calibration technique, the projector is adjusted for individual channels (e.g., red, green, blue), rather than collectively adjusting the various color or wavelength channels together. This allows the applied correction to be perfected for each channel individually, rather than conventional methods that typically compromise on select channel calibration in order to calibrate the entirety of the image.

In one embodiment, the system includes one or more projectors, a camera, and a computer. Initially, the default color correction settings of a projector are determined and may be adjusted. Often the standard color correction settings of a projector (e.g. onboard software) may not include "pure" wavelength channel activation even when a single channel is selected, e.g., the blue channel may incorporate a small amount of green light in the default settings. In order to properly calibrate a channel, the default settings for the projector may need to be adjusted to ensure the channel can be solely activated when desired. After adjustment, the projector is able to selectively display pure primary light channels. All references herein to light refer to electromagnetic energy of any wavelength, whether visible or invisible to the human eye.

Once the projector settings have been modified (if needed), one or more input calibration patterns are projected by a primary light channel activated (e.g., red, green, blue visible light for standard color projector) or by a first light channel, second light channel, third light channel, where the first, second, and third channels display light in wavelength bands that do not overlap or do not substantially overlap The input calibration patterns can be the same for the channels or tailored based on the selected channel.

Test images are captured by a camera or other image capturing device (e.g., image sensor) for the input calibration patterns. Then, using the captured images, a pixel displacement map is determined, the map including pixel location information correlating an input pixel location to the actual projected pixel location on a channel by channel basis. Using the pixel displacement map a correction map is generated, translating input pixel locations into corrected pixel locations. The correction in pixel locations can adjust chromatic aberration or other distorting effects on the projected image. The corrective mapping is done channel by channel and used to update the color or wavelength channel for input media before projection. Because the calibration process utilizes mapping and other techniques to automatically adjust an input image, the calibration does not require an individual to manually adjust the projector color based on an estimated view of the image, but rather than can be done automatically and mathematically to accurately correct aberrations and the like.

After correction (either to the media or the select wavelength channels), the projector projects the corrected color-separated media portions together onto the projection surface to form the desired mixed colors (if included) in the formed final projection image. Due to the separate calibration of the channels, certain channel components corresponding to pixels of the image may be in different locations in the input media, but as the input media has been adjusted to account for the lens distortion, aberration, and the like, once the color is projected through the lens, the correct color components will end up at the expected projection location. This is compared to conventional calibration techniques where all of the color contributions for a pixel are corrected similarly, and thus after projection, select color contributions may be projected in the wrong location due to the specific effect of a particular distortion on a specific color channel.

Figure 2:
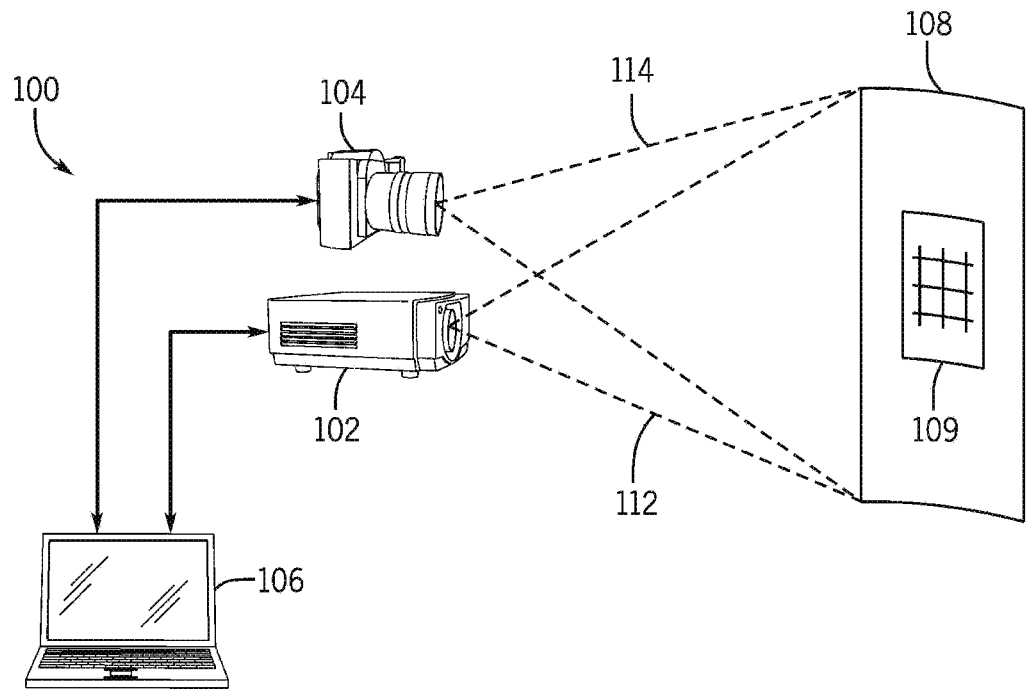
FIG. 2 is a perspective view of a system for calibrating a projector.

FIGS. 1 and 2 illustrate various views of a projection system 100. In FIG. 1, the projection system 100 includes multiple projectors 102 projecting images onto a projection surface 108, through a projection environment 117. The projectors 102 may be in communication with one or more computing elements, e.g., media player 110 and intermediate processor 119. Additionally, the system 100 a camera 104 including a field of view (FOV) directed toward the projection surface 108 and aligned with a FOV 114 of one or more of the projectors 108. During operation, the projector 108 projects light onto the projection surface 108 and the camera 104 captures images of the formed images to supply data to the computing systems for calibration.

The projection environment 117 defines the media through which light from the projector 102 travels before interacting with the projection surface 108. Typically, the projection environment 117 is air, but may also be any other material such as glass, various plastics, water, as well as other fluids through which electromagnetic energy may travel. As can be appreciated, the projection environment 117 may include characteristics that alter the positioning and distortion of light on the projection surface 108 and so may be considered and corrected for in the calibration techniques described below.

The projection surface 108 defines the surface on which an image is formed or the light from the projector 108 reflects from. The projection surface 108 may be substantially any type of surface, including planar, arbitrarily shaped, textured, off-white, colored, or the like. Projection surface 108 may be either reflective, transmissive, or may exhibit both properties with respect to primary light channels. It should be noted that although FIGS. 1 and 2 illustrate a front projection system, the techniques described herein are applicable to both front and rear projection systems. In instances of a rear projection system, the projector may be positioned behind the projection surface 108 and the image may be formed on the front side surface.

Figure 3:
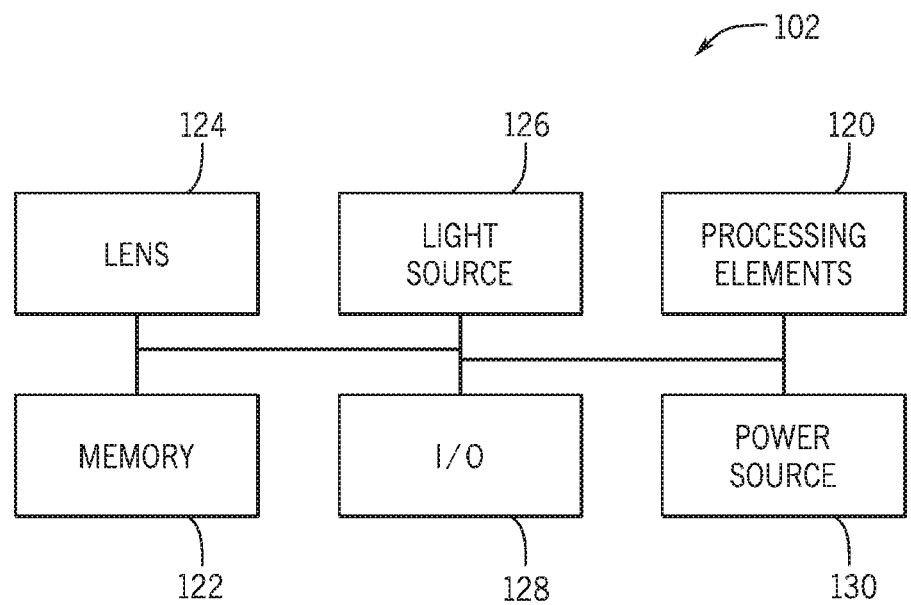
FIG. 3 is a simplified block diagram of the projector of FIG. 2.

The projector 102 can be any device that projects and spatially controls light. In some examples, the projector 102 may be a digital light processing (DLP) projector, liquid crystal display (LCD) projector, liquid crystal on silicon (LCoS), or other type of projector, rastered image projector, or the like. FIG. 3 is a simplified block diagram of the projector 102. With reference to FIG. 3, the projector 102 includes one or more processing elements 120, one or more memory components 122, a lens 124, a light source 126, an input/output interface 128, and/or a power source 130.

The processing element 120 is substantially any electronic device capable of processing, receiving, and/or transmitting instructions, including a graphics processing unit, server, processor, or the like. The memory 122 stores electronic data used by the projector 102. The input/output interface 128 provides communication to and from the projector 102, the camera 104, and/or computer 106, as well as other devices. The input/output interface 128 can include one or more input buttons, a communication interface, such as WiFi, Ethernet, or the like, as well as other communication components such as universal serial bus (USB) cables, or the like. The power source 130 may be a battery, power cord, or other element configured to transmit power to the components of the projectors.

The light source 126 emits electromagnetic energy in desired wavelengths of the electromagnetic spectrum and may not be limited to visible light, e.g., may emit UV and IR wavelengths and in varying bands. The light source 126 may be varied depending on the desired projection features, but may include one more light emitting diodes (LED), incandescent bulbs, halogen lights, lasers, radio frequency emitters, microwave, x-ray, or gamma ray sources, or the like. The lens 124 is in optical communication with the light source 126 and transmits light from the light source 126 to the projection surface 108. The lens 124 is any mechanism that controls or bends primary light channels, including glass, plastic, and so on. In many instances, the lens 124 varies one more parameters to affect the light, such as focusing the light at a particular distance. However, in some instances, such as when the projector is a laser projector, the lens may be omitted.

The projector 102 frequently includes a color correction feature that can be adjusted automatically and/or manually. The color correction feature is stored in the memory 122 of the projector 102 and allows adjustment of the light channels used to make up an individual pixel of a visual media content. Additionally, the color correction and processing element may include wavelength bands, channels, or color chips corresponding to discrete wavelengths or bands of wavelengths corresponding to a particular color or spectrum, e.g., red light, blue light, and green light.

The camera 104 or image capturing device is any device that can capture images of the projected light, including visible and/or non-visible light. The camera 104 typically includes a lens and an image sensor. The type of image sensor and lens are typically varied based on the camera, and the wavelengths of the primary light channels being calibrated. In many examples the camera 104 is captures color images that may be perceived by human vision. However, in other embodiments the camera may be configured to capture primary light channels outside the range of human visual perception. It is desirable for the image sensor of the camera 104 to be able to capture the entire dynamic range of the projector 102 without severe clipping. The camera 104 is typically optically aligned with the projector 108 to ensure that images captured by the camera 104 can be translated to the image plane of the projector. The optical alignment can be achieved physically and/or electronically through software and other calibration processes.

Figure 4:
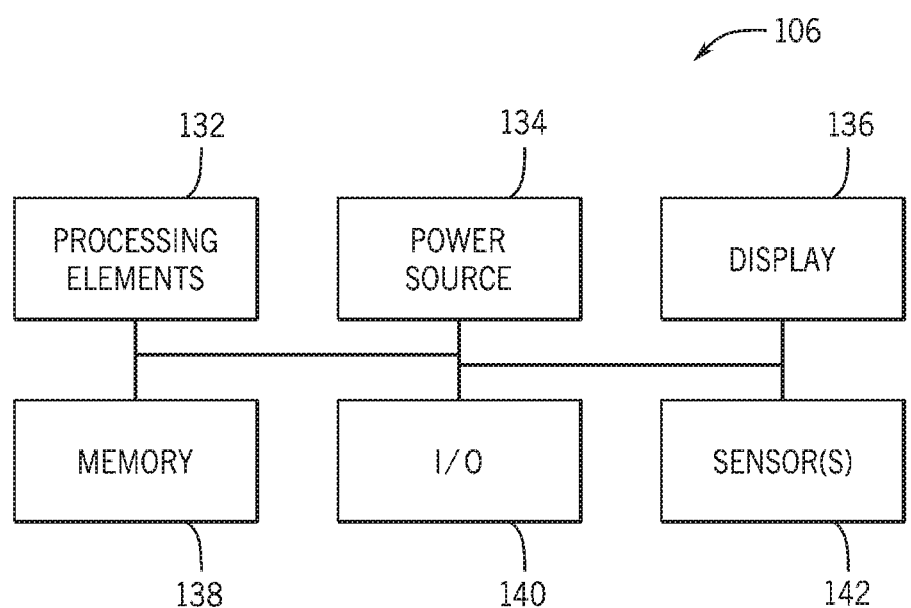
FIG. 4 is a simplified block diagram of a computer of FIG. 2.

Projector 102 and the camera 104 are in communication with one or more computers 106. In the example shown in FIG. 2 only one computer 106 is shown, but it should be noted that one or more computers may be used. FIG. 4 is a simplified block diagram of the computer 106. With reference to FIG. 4, the computer 106 may include one or more processing elements 132 capable of processing, receiving, and/or transmitting instructions. For example, the processing elements 132 may be a microprocessor or microcontroller. Additionally, it should be noted that select components of the computer 106 may be controlled by a first processor and other components may be controlled by a second processor, where the first and second processors may or may not be in communication with each other.

The computer 106 may also include memory 138, such as one or more components that store electronic data utilized by the computer 106. The memory 138 may store electrical data or content, such as, but not limited to, audio files, video files, document files, corrected or uncorrected visual media content, corrective pixel displacement maps and so on, corresponding to various applications. The memory 138 may be, for example, magneto-optical storage, read only memory, random access memory, erasable programmable memory, flash memory, or a combination of one or more types of memory components. In some embodiments, the memory component may be required to store 254 floating point values for the primary light channels for the pixels, which depending on the resolution of the projector, may require several gigabytes of memory. Accordingly, in some instances, the memory component 138 may be sufficiently large to handle this type of data storage, but can be adjusted based on the resolution of the projector and/or camera or based on other factors.

Computer 106 includes a power source 134 that provides power to the computing elements and an input/output interface 140. The input/output interface 140 provides a communication mechanism for the computer 106 to other devices, such as the cameras and/or projectors, as well as other components. For example, the input/output interface may include wired, wireless, or other network or communication elements.

Optionally, the computer 106 can include or be in communication with a display 136 and have one or more sensors 142. The display 136 provides a visual output for the computer 106 and may also be used as a user input element (e.g., touch sensitive display). The sensors 142 include substantially any device capable of sensing a change in a characteristic or parameter and producing an electrical signal. The sensors 142 may be used in conjunction with the cameras, in place of (e.g., image sensors connected to the computer), or may be used to sense other parameters such as ambient lighting surrounding the projection surface 108. The sensors 142 and display 136 of the computer 112 can be varied as desired to meet the needs of a particular application.

With reference to FIGS. 5A-7, the calibration method 300 utilizing the projection system 100 may begin with operation 302 and the current or default color management settings (e.g., manufacture color blending and/or correction settings) for the projector 102 are determined. Often, off the shelf projectors 102 include corrective management configurations that select a mixture of red, green, and blue light to generate desired colors. Further, the color management settings may also include default corrective inputs to adjust for expected distortion. These color management settings can impact the channel displays, for example, some projectors may include management settings that include a small amounts of blue or green light with an input to project a red pixel or the like. To achieve the desired calibration, typically the superposition of different colors may prevent the accurate calibration of a channel and therefore may be deactivated in operation 302. However, in some instances the color management for the projector 102 may be reapplied before projection and so may be stored in memory or the like.

After the color correction settings of a projector are determined, the method 300 proceeds to operation 304 and the projector is configured to selectively activate single primary light channels or wavelength bands. For example, with a visible light projector, the projector 102 is instructed (e.g., through the on-board processor or the like) that activation of a particular color should result in only light corresponding to selected color to be generated, e.g., red corresponding to red wavelength (electromagnetic energy with wavelengths of approximately 622-770 nanometers), blue corresponds to blue light wavelengths (electromagnetic energy with wavelengths of approximately 455-492 nanometers), and green corresponds to green wavelengths (electromagnetic energy with wavelengths of approximately 492-577 nanometers). As should be understood, in many examples, the wavelengths in the bands may not be overlapping so as to correspond to different "colors" or other selected grouping of electromagnetic energy.

In some instances, the color management settings within projector 102 are disabled. For example, utilizing the settings functions in the projector 102, the color management input or other setting can be deactivated. In other instances, with a projector 102 that uses a plurality of lasers or LEDs as the light source, corresponding to one of the primary color channels (e.g., first light channel, second light channel, third light channel), may include instructing the projector 102 to only activate LEDs or lasers corresponding to the selected color, leaving the others unpowered or deactivated. In yet other examples, such as with a projector 102 that uses a white light source (such as a xenon bulb or an ultra-high performance, high-pressure mercury arc lamp (UHP)) and a filtering mechanism, may include commanding the filtering mechanism to only transmit or reflect the selected color, for example, blue.

After operation 304, the method proceeds to operation 306 and a primary light channel is selected for calibration. For example, the set of primary light channels may include red, green, and blue light. The set may also include cyan (a combination of blue and green light), magenta (a combination of blue and red light) and yellow (a combination of green and red light) light. The set may also include wavelengths outside the range of human visual perception such as ultraviolet (electromagnetic energy with wavelengths of approximately 10-390 nanometers), infrared (electromagnetic energy with wavelengths of approximately 770-10$^6$ nanometers), radio frequency (electromagnetic energy with wavelengths of approximately $10^6$-$10^{11}$ nanometers), microwaves (electromagnetic energy with wavelengths of approximately $10^3$-$10^6$ nanometers), x-rays (electromagnetic energy with wavelengths of approximately $10^{-2}$-$10^{-6}$ nanometers), or gamma rays (electromagnetic energy with wavelengths of approximately $10^{-4}$-$10^{-8}$ nanometers). The foregoing ranges are only approximations representing distributions along the electromagnetic spectrum, and may overlap.

Figure 5A:
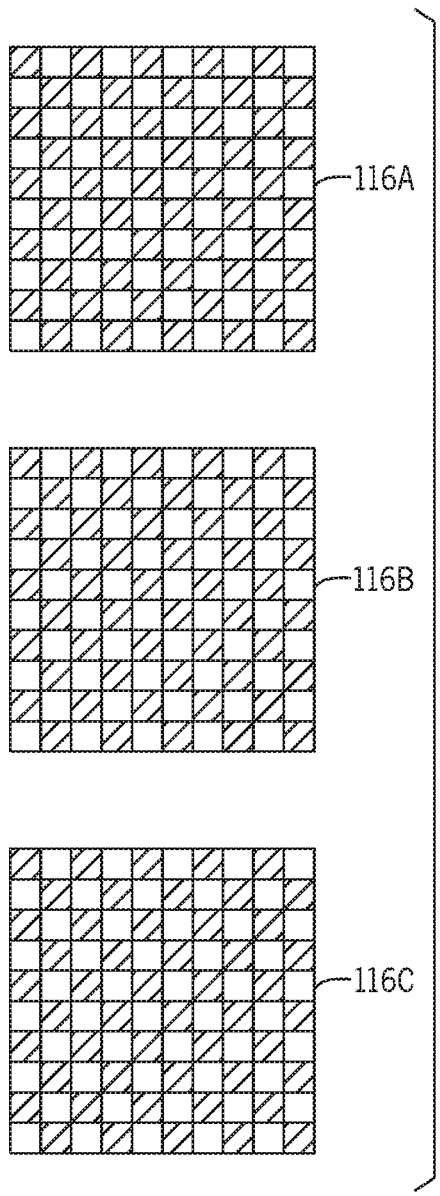
FIG. 5A is an example of calibration patterns displayed in first, second, and third wavelength bands.
Figure 5B:
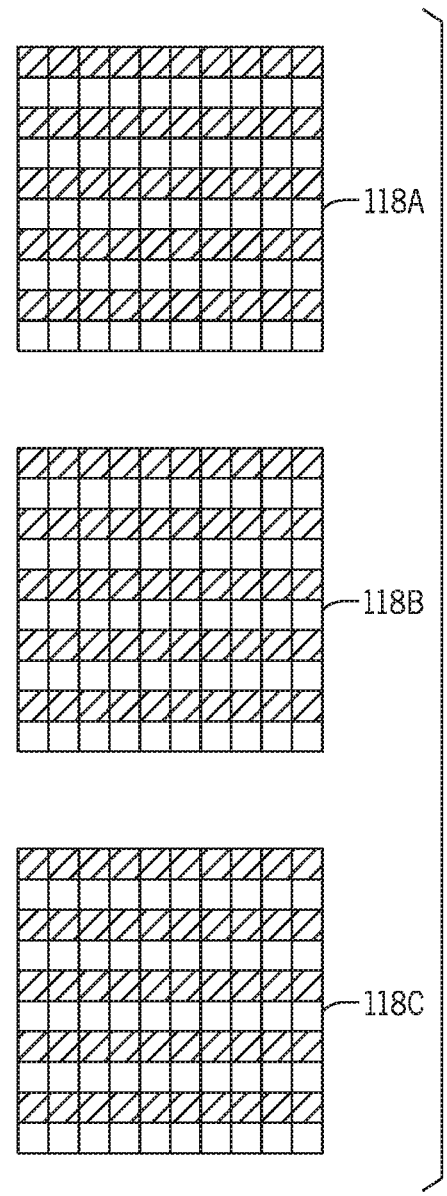
FIG. 5B is another example of calibration patterns displayed in first, second, and third wavelength bands.

Once a channel has been selected, the method 300 proceeds to operation 308 and one or more input calibration patterns are projected by the projector 102. For example, one or more input calibration patterns such as 116A or 118A are displayed by a projector 102 on a projection surface 108 in the selected primary light channel, for example red. FIGS. 5A-5B show examples of input calibration patterns 116A-C and 118A-C displayed in a set of selected primary light channels, individually. The input calibration patterns may be non-repeating such that the pixels can be identified or may otherwise include elements that assist in identifying pixel locations. As the input calibration patterns are displayed in a single channel or color, the patterns include variations in brightness and intensity, rather than color, in order to provide identification of the pixel locations. Input calibration patterns may be any suitable geometric shape and may be displayed in any suitable primary light channel.

In operation 310, the camera 104 captures one or more resulting calibration images formed on the projection surface 108 while the one or more input calibration patterns are projected by the projector 102. The number of calibration images may vary, but in some instances may be sufficient number that when analyze together allow pixels in the projection area to be individually or uniquely identified. For example, analyzing calibration patterns across multiple calibration images for a particular color channel provides information to allow a pixel correspondence from projector to projection surface. In one example, 40-70 calibration images may be captured of varying projected calibration patterns and in a specific example 50-60 images may be captured. The number of images required may be varied both on the patterns used and the number of pixels to be identified.

Once the resulting calibration images have been captured, the method 300 proceeds to operation 312 and plurality of pixel displacement maps for the selected light channel is determined by the computer 106 (e.g., via processing element 132). To form a pixel displacement map in operation 312, processing element 132 analyzes the pixels in the resulting calibration images and compares the captured pixel location to an input location in the corresponding input calibration patterns 116A-C, 118A-C. Processing element 132 then computes a horizontal displacement and a vertical displacement for the pixels in the resulting calibration image relative to the expected location of the pixels in the input calibration pattern 116A-C, 118A-C. Horizontal and vertical displacement may comprise vectors, containing both magnitude and direction of the displacements for the pixels relative to the expected projection location.

The pixel displacement maps resulting from operation 312 contains information for pixels of the displayed input calibration patterns and resulting calibration images for the primary light channel. Information in the displacement map may include the expected location for the pixels; the location where the pixel was actually displayed, as captured by camera 104 in the resulting calibration image; expected brightness and resulting brightness information, vertical displacement and horizontal displacement vectors of the pixels representing the differences in magnitude and direction between where the pixels were expected to be displayed, and where they were actually displayed, resolved along mutually orthogonal axes. For example, a horizontal displacement vector may include information indicating that a given pixel in a red channel is displaced 10 millimeters to the left, relative to an expected projection location. A vertical displacement vector may include information that the same pixel in a red channel is displaced 5 millimeters down, relative to an expected projection location.

In other embodiments, a single displacement vector is calculated that is not resolved along orthogonal horizontal or vertical axes, but is measured as a distance relative to an expected pixel location and a direction relative to a reference axis, as in a polar coordinate system. For example, a single displacement vector may include information indicating that a given pixel in a red channel is displaced 10 millimeters relative to an expected projection location at 45 degrees to the right of a vertical reference axis. Continuing this example, for the same pixel, the horizontal and vertical displacements when displayed in the red, green, and blue primary light channels may be different from each other. The displacement map may be in the form of a graphical location lookup table, matrix, or the like. The data and form of the displacement map may vary as desired.

Next, in operation 314 computer 106 calculates a corrective pixel displacement map for a projector 102 in the projector system 100 for the primary light channels, from the plurality of pixel displacement maps resulting from operation 312. Corrective pixel displacement maps are stored in the computer 106 memory 138, or may be transmitted to other devices by input/output interface 140. For the pixels in the pixel displacement maps, for the primary light channels, computer 106 calculates one or more corrective displacement vectors equal in magnitude and opposite in direction to the displacement vectors. The corrective pixel displacement map may contain information for the pixels, for the primary light channel, for a projector 102 within a projection system 100. Corrective pixel maps may include information such as a designation of the projector 102, the primary light channel, a designation of the pixels within the projector 102, and one or more corrective displacement vectors equal in magnitude and opposite in direction from the displacement vectors captured in the pixel displacement maps resulting from operation 312. The primary light channels for the projectors 102 may have different corrective pixel displacement maps.

Continuing the example above, for a pixel that, in a red primary light channel, is offset 10 millimeters to the left and 5 millimeters down relative to an expected projection location, the corrective pixel displacement map would include information that the pixel should be displaced 10 millimeters to the right and 5 millimeters up relative to the expected projection location. Continuing the example above, for a polar coordinate system, for a pixel that, in a red channel, is displaced 10 millimeters relative to an expected projection location, and 45 degrees to the right of a vertical axis, the corrective pixel map would include information that the pixel should be displaced 10 millimeters relative to an expected projection location at a direction 180 degrees from the displacement direction, or 225 degrees to the right of a vertical reference axis.

When corrective pixel displacement maps are applied to visual media the net effect of the actual displacement of pixels in the projection system 100 and the corrective displacements included in the corrective pixel displacement maps is to cancel one another, removing the effects of chromatic aberration, for the pixels in a primary light channel. The pixels in the channel are thus displayed in the expected locations, despite the environmental & hardware effects on the light. As should be understood, the corrective displacement pixel map is per channel. In short, the corrective pixel displacement map includes distance or location adjustment data that contains the various effects on the light by its path to the projection surface.

In operation 316, the next primary light channel is selected for calibration and operations 306-316 are repeated until all primary light channels have been calibrated. After all of the primary light channels are calibrated in a given projector 102, the color correction settings captured in operation 302 are restored to the projector 102 in operation 318. The method 300 may be repeated for projector 102 in a projection system 100 with the same or different input calibration patterns and/or the same or different set of primary light channels.

It should be appreciated that the methods and systems disclosed herein are effective at adjusting for both axial and lateral chromatic aberration. Axial chromatic aberration occurs when different primary light channels focus on a projection surface 108 at different distances from a projector 102 lens 124, and is predominant with long focal length lenses. Lateral chromatic aberration occurs as described by Snell's law when primary light channels are diffracted or bent more or less in relation to one another in a given environment, and is predominant with wide angle (i.e., short focal length) lenses.

Figure 8:
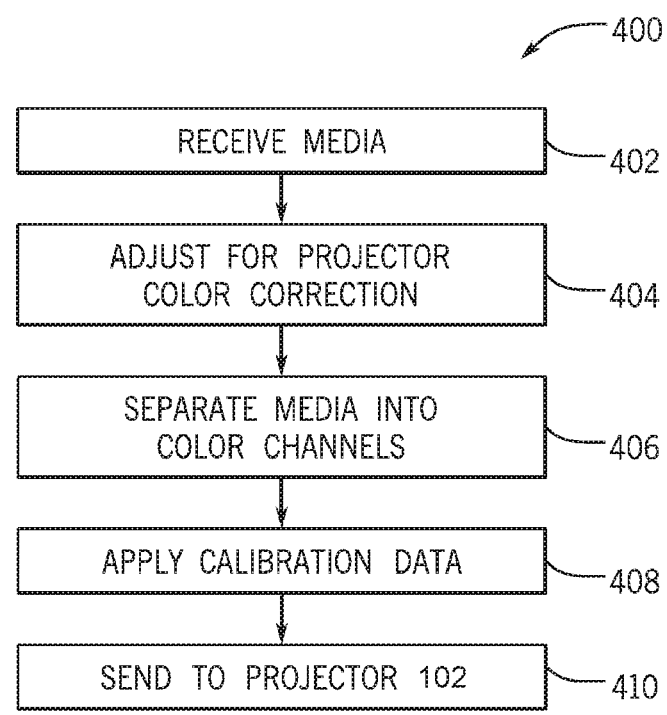
FIG. 8 is a flow chart illustrating a method for applying corrective pixel displacement maps to media content.

With reference to FIG. 8, method 400 to correct and display corrected visual media is shown. In operation 402, a device such as a computer 106 receives an original visual media content (e.g., images, video, or the like). The device could also be a projector 102 with built-in processing elements 120, or an intermediate processor 119 interposed between a media player 110 and a projector 102.

Figure 6:
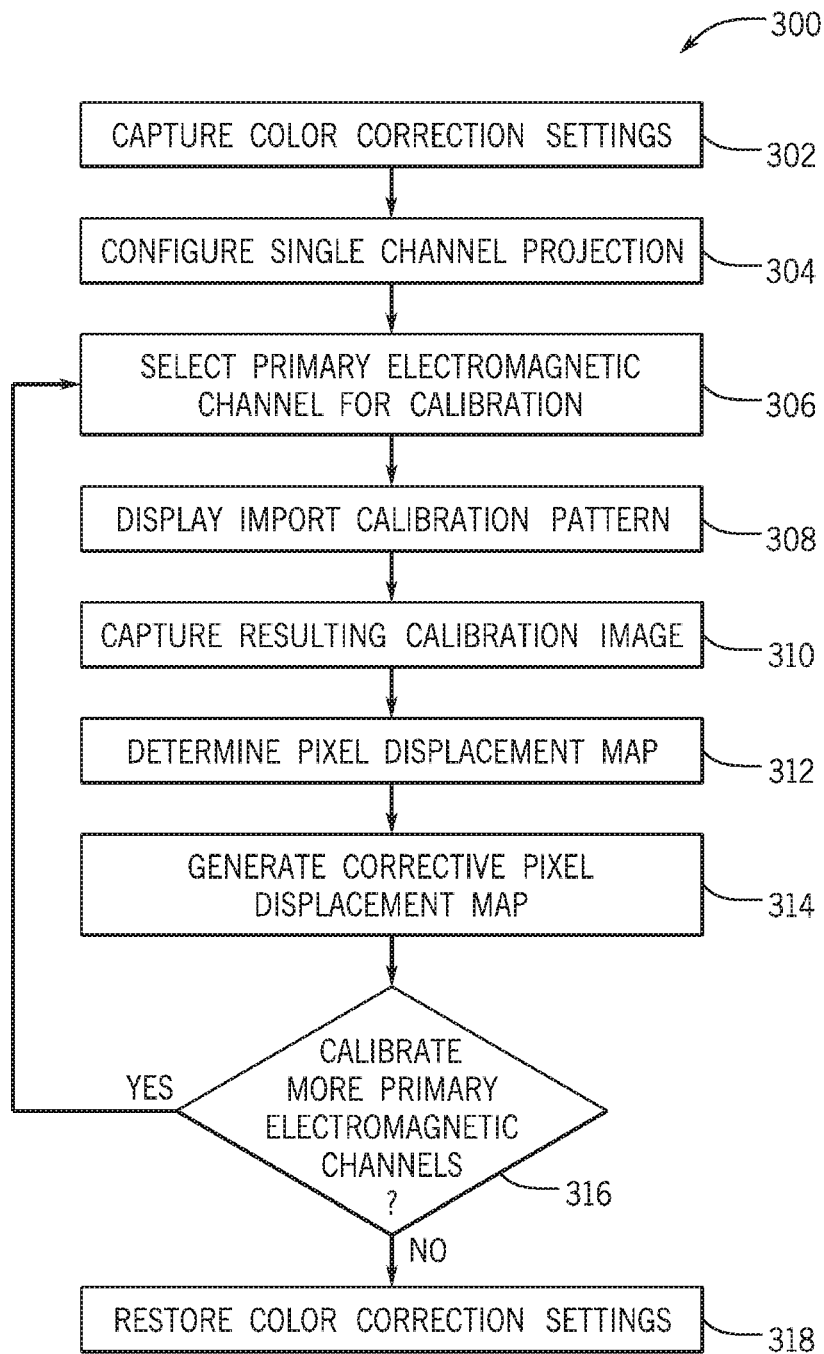
FIG. 6 is a flow chart illustrating a method for calibrating a projector using the system of FIG. 2.

In operation 404, the computer 106 may adjust the uncorrected or original visual media content colors to account for color correction settings such as those captured in operation 302, FIG. 6 for a particular projector 102. The computer 106 may receive corrective pixel displacement maps for a given projector 102, projector environment 117, and set of primary light channels, or may have the same already stored in its memory 138.

Figure 7:
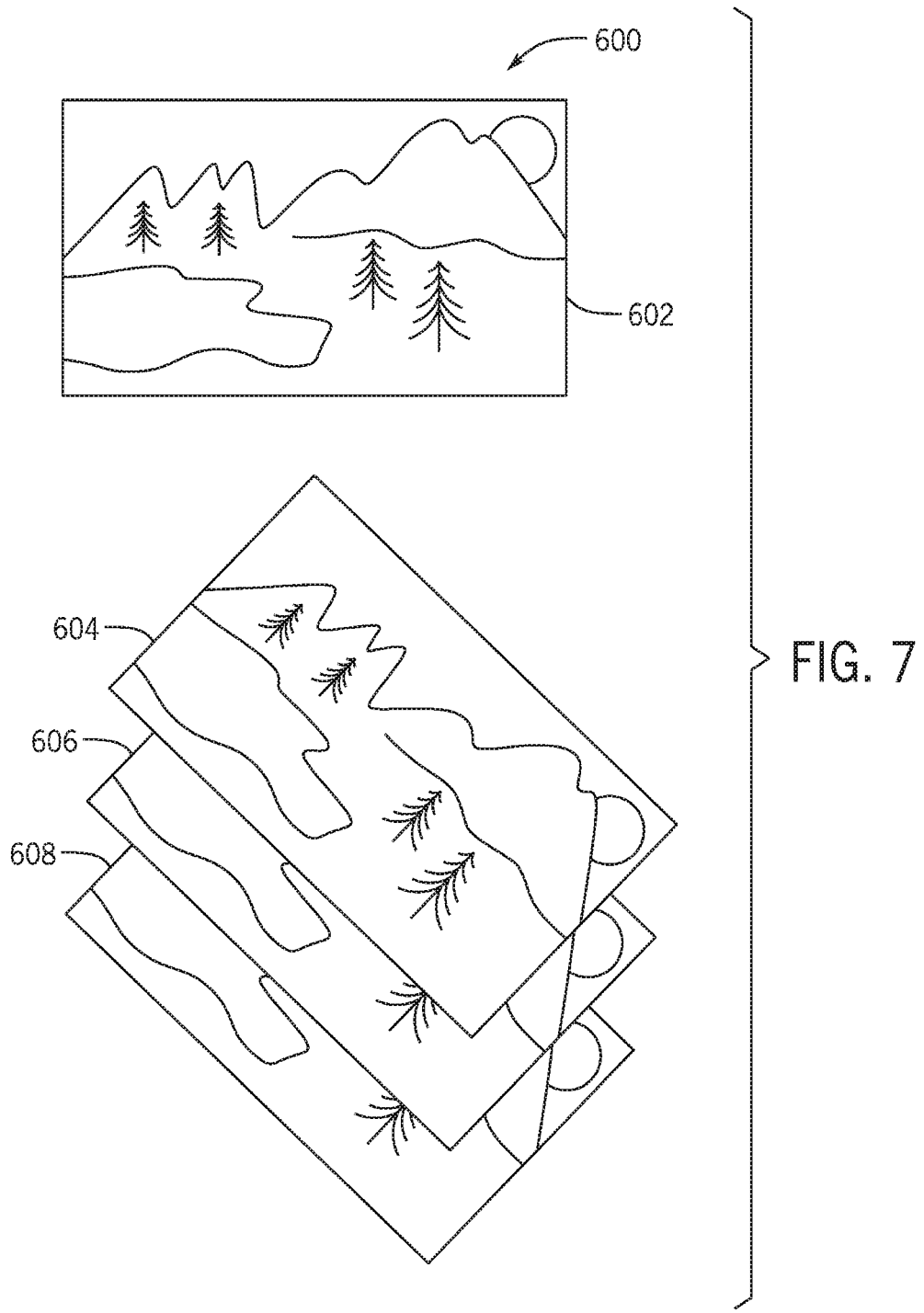
FIG. 7 is an illustration of media content separated into a first, second and third media portion according to primary color channels.

In operation 406, the computer 106 separates the uncorrected visual media content into color-separated media portions 604, 606, and 608. FIG. 7 shows an example of a single frame 602 of an uncorrected visual media content 600 separated into color-separated media portions 604, 606, and 608. Operation 406 may include forming one or more color-separated media portions 604, 606, and 608 by selecting the portions of an uncorrected visual media stream that correspond to one or more primary light channels. This operation may be handled by the graphics element, e.g., graphics processing unit, during the raster process to separate out the color inputs for frames of the media. The color-separated media portions 604, 606, and 608 corresponds to one of the primary light channels that were used to calibrate projectors 102 in method 300. For example, if a projector is calibrated according to the method 300 using red, green, and blue light, the color-separated media portions 604, 606, and 608 would correspond to the red, green, and blue components of the uncorrected visual media content, respectively.

Next, in operation 408, the computer 106 applies a corresponding corrective pixel displacement map to the color-separated media portions 604, 606, and 608. For example, if color-separated media channel 604 is red light, the corrective pixel map for red would be applied. The pixels in color-separated media channel 604 would be displaced an amount and direction as specified in the red corrective pixel map. The output of this operation is a set of corrected color-separated media portions.

In operation 410, the corrected color-separated media portions are output to the appropriate projector 102. The corrected color-separated media portions may be output to a projector 102 as discrete channels. Corrected color-separated media portions may be also be recombined into a single corrected visual media content and then output to a projector 102.

In one embodiment of the disclosure, a projector 102 may be calibrated with a variety of available lenses. A set of corrective pixel displacement maps is developed for the lenses, as disclosed herein. The set of corrective pixel displacement maps for available lenses is stored on a memory 122 of a projector 102. When a lens is placed on a projector, the projector may electronically recognize the lens, or may be manually configured with information about the installed lens. The projector 102 may then separate uncorrected visual media content into color-separated media portions, apply the appropriate corrective pixel displacement maps, and display corrected visual media content according to the methods disclosed herein.

In various examples, the projection system may be configured to project through projection environments 117 other than air. For example, it may be desirable to project through water, or other fluid (liquid or gas), solids, particle spray, fume, smoke, mist, steam, or other mixture of matter containing any combination of solids, liquids, gases or plasma, in any proportions, whether aerosolized, or in particles in any shape or size, whether still or moving. In these projection environments the primary light channels of a projector 102 will react, scatter, and/or refract differently with respect to the type of matter present. The disclosed methods and systems will enable projection in these environments and adjust the output image to correct for the various distortions or changes that occur to the light as it travels through the projection environment. This allows the projection system to project accurate images, even in typically "difficult" projection environments.

Further, the calibration methods may be configured to be executed automatically by the projection system. For example, the projector may include an on-board camera and stored calibration images and method instructions, where the calibration can be selectively activated by a user or at other selected times (e.g., scheduled intervals or the like). The resulting corrective pixel maps can then be used to update projection settings for the color channels and/or dynamically adjust input media before projection. Alternatively or additionally, corrective pixel displacement maps may be stored either in a memory 138 of a computer 106 or in a memory 122 of a projector 102. Corrective pixel displacement maps may be applied to input media content by processing elements 132 of a computer 106, or processing elements 120 of a projector 102.

In some embodiments of the disclosure, projection systems using more aggressive or wider angle lenses 124 than would otherwise be acceptable may be enabled by the methods and systems disclosed herein. Extreme wide-angle lenses are highly susceptible to lateral chromatic aberration, while extreme long focal length lenses are susceptible to axial chromatic aberration. The methods and systems disclosed herein are effective at compensating for both types of aberration.

CONCLUSION

The methods and systems are described herein with reference to a front projection system with a reflective projection surface. However, these techniques are equally applicable to rear projection systems where the projection surface is transmissive or diffusive rather than reflective. Further, the methods and systems described herein may be used to project images through any suitable gaseous, liquid or solid environment including air, water, other fluids, glass, plastic or any other suitable material.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A calibration method to calibrate a projector comprising a first light channel and a second light channel, the method comprising:
   displaying by the projector utilizing the first light channel a first calibration pattern onto a projection surface, wherein the first light channel emits light within a first wavelength band that does not overlap with light wavelengths projected by the second light channel;
   capturing by a camera a first calibration image of the first calibration pattern on the projection surface; and
   generating by a processing element a first corrective pixel map by comparing the first calibration image to the first calibration pattern.

2. The method of claim 1 further comprising:
   displaying by the projector utilizing the second light channel a second calibration pattern onto a projection surface;
   capturing by the camera a second calibration image of the second calibration pattern on the projection surface; and
   generating by a processing element a second corrective pixel map by comparing the second calibration image to the second calibration pattern.

3. The method of claim 2 further comprising:
   displaying by the projector utilizing a third light channel a third calibration pattern onto a projection surface, wherein the third light channel emits light within a third wavelength band that does not overlap with light wavelengths projected by the first light channel or the second light channel;
   capturing by the camera a third calibration image of the third calibration pattern on the projection surface; and
   generating by a processing element a third corrective pixel map by comparing the third calibration image to the third calibration pattern.

4. The calibration method of claim 3, wherein the third light channel corresponds to a third light color.

5. The calibration method of claim 1, wherein the first light channel corresponds to a first light color and the second light channel corresponds to a second light color.

6. A method for correcting visual media content comprising:
   receiving by a processing element visual media content;
   separating the visual media content into a first media portion corresponding to a first primary color channel;
   modifying by the processing element the first media portion to generate a first output media portion by translating input pixels to corrective pixels utilizing a corrective pixel map corresponding to the first primary color channel; and
   displaying the first output portion by a projector.

7. The method of claim 6 further comprising:
   separating the visual media content into a second media portion corresponding to a second primary color channel;
   modifying by the processing element the second media portion to generate a second output media portion by translating input pixels to corrective pixels utilizing a corrective pixel map corresponding to the second primary color channel;
   displaying the second output portion by a projector.

8. The method of claim 7 further comprising:
   separating the visual media content into a third media portion corresponding to a third primary color channel;
   modifying by the processing element the third media portion to generate a third output media portion by translating input pixels to corrective pixels utilizing a corrective pixel map corresponding to the primary color channel;
   displaying the third output portion by a projector.

9. The method of claim 8, wherein the first primary color channel corresponds to light within a wavelength band that does not overlap with a light wavelength band of the second primary color channel.

10. The method of claim 9, wherein the third primary color channel corresponds to light within a wavelength band that does not overlap with the light wavelength of the first primary color channel, and does not overlap with the light wavelength band of the second primary color channel.

11. The method of claim 10 further comprising:
    combining the first, second, and third output media portions into output visual media content.

12. A projector comprising:
    a camera;
    a light source to project images onto a projection surface; and
    a computer in communication with the camera and the light source, the computer comprising a processor configured to perform the following operations:
       display a first calibration pattern in a first light channel of the light source;
       receive by the camera a first calibration image of the first calibration pattern;
       generate by a processing element a first corrective pixel map by comparing the first calibration image to the first calibration pattern; and
       modify by the processing element an input media to generate a first output media by translating input pixels to corrective pixels utilizing the first corrective pixel map; and
       display the first output media by the light source.

13. The projector of claim 12, wherein the processor is further configured to:
    display a second calibration pattern in a second light channel of the light source;
    receive by the camera a second calibration image of the second calibration pattern;
    generate by the processing element a second corrective pixel map by comparing the second calibration image to the second calibration pattern;

modify by the processing element the input media to generate a second output media by translating input pixels to corrective pixels utilizing the second corrective pixel map; and display the second output media by the light source.

14. The system of claim 13, wherein the processor is further configured to:

display a third calibration pattern in a third light channel of the light source;

receive by the camera a third calibration image of the third calibration pattern;

generate by the processing element a third corrective pixel map by comparing the third calibration image to the third calibration pattern; and modify by the processing element the input media to generate a third output media by translating input pixels to corrective pixels utilizing the third corrective pixel map; and display the third output media by the light source.

15. The method of claim 14, wherein the first light channel corresponds to light within a wavelength band that does not overlap with a light wavelength band of the second light channel.

16. The method of claim 15, wherein the third light channel corresponds to light within a wavelength band that does not overlap with the light wavelength of the first light channel, and does not overlap with the light wavelength band of the second light channel.

17. The system of claim 14, wherein the first output media is combined with the second output media, and the third output media into a combined output media.

18. A projection system comprising:

an image capturing device;

a light source comprising two or more light channels corresponding to select light wavelengths that project images onto a projection surface; and a processor in communication with the image capturing device and the light source, configured to perform the following operations:

activate a first light channel to display a first calibration pattern on the projection surface;

receive from the image capturing device a first calibration image of the first calibration pattern as projected on the projection surface;

generate a first corrective pixel map by comparing the first calibration image to the first calibration pattern;

modify an input media to generate a first output media by translating input pixels of an input media to corrective pixels utilizing the first corrective pixel map; and activate the light source to display the first output media.

19. The system of claim 18, wherein the processor is further configured to:

activate a second light channel of the light source to display a second calibration pattern;

receive from the image capturing device a second calibration image of the second calibration pattern as projected on the projection surface;

generate a second corrective pixel map by comparing the second calibration image to the second calibration pattern;

modify the input media to generate a second output media by translating input pixels of the input media to corrective pixels utilizing the second corrective pixel map; and activate the light source to display the second output media by the.

20. The system of claim 19, wherein the processor is further configured to:

activate a third light channel of the light source to display a third calibration pattern on the projection surface;

receive from the image capturing device a third calibration image of the third calibration pattern as projected on the projection surface;

generate a third corrective pixel map by comparing the third calibration image to the third calibration pattern;

modify the input media to generate a third output media by translating input pixels of the input media to corrective pixels utilizing the third corrective pixel map; and activate the light source to display the third output media.

* * * * *